(12) United States Patent
Montemurro et al.

(10) Patent No.: US 9,332,448 B2
(45) Date of Patent: May 3, 2016

(54) EFFECTING CHANGE TO TRANSMIT DUTY CYCLE OF WLAN TRANSCEIVER

(71) Applicant: Blackberry Limited, Waterloo (CA)

(72) Inventors: Michael Peter Montemurro, Toronto (CA); Richard Howard Kennedy, Austin, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 168 days.

(21) Appl. No.: 14/015,730

(22) Filed: Aug. 30, 2013

(65) Prior Publication Data
US 2015/0063131 A1   Mar. 5, 2015

(51) Int. Cl.
*H04W 24/08* (2009.01)
*H04W 52/02* (2009.01)

(52) U.S. Cl.
CPC .......... *H04W 24/08* (2013.01); *H04W 52/0216* (2013.01); *H04W 52/0251* (2013.01)

(58) Field of Classification Search
None
See application file for complete search history.

(56) References Cited

U.S. PATENT DOCUMENTS

| 8,244,296 | B2 | 8/2012 | Dorsey et al. | |
| 8,346,299 | B2 | 1/2013 | Dorsey et al. | |
| 2008/0004067 | A1 | 1/2008 | Piipponen et al. | |
| 2008/0025341 | A1 | 1/2008 | Rao et al. | |
| 2010/0091747 | A1 * | 4/2010 | Dorsey et al. | 370/338 |
| 2011/0021170 | A1 * | 1/2011 | Kolze et al. | 455/296 |
| 2013/0229964 | A1 * | 9/2013 | Chakravarthy et al. | 370/311 |

FOREIGN PATENT DOCUMENTS

| WO | 2009/149023 | 12/2009 | |
| WO | WO2009/149023 A1 * | 12/2009 | H04B 1/38 |

OTHER PUBLICATIONS

International Search Report and Written Opinion of the International Searching Authority issued in International Application No. PCT/US2014/052694 on Dec. 4, 2014; 8 pages.
IEEE Std 802.11—2012, Part 11: Wireless LAN Medium Access Control (MAC) and Physical Layer (PHY) Specification; IEEE Standards Association; pp. 2793.

* cited by examiner

*Primary Examiner* — Omar Ghowrwal
(74) *Attorney, Agent, or Firm* — Fish & Richardson P.C.

(57) ABSTRACT

An apparatus has a wireless local area network (WLAN) transceiver and one or more sensors. The sensors are monitored. From time to time, a mitigation level applicable to the apparatus is determined as a function of output from the one or more sensors. The mitigation level is one of multiple mitigation levels, each mitigation level corresponding to a set of configuration changes for a Media Access Control (MAC) layer of the WLAN transceiver. Responsive to determining that the applicable mitigation level has increased from a most recent previously determined mitigation level, the MAC layer is configured to effect a decrease in a transmit duty cycle of the WLAN transceiver. Responsive to determining that the applicable mitigation level has decreased from a most recent previously determined mitigation level, the MAC layer is configured to effect an increase in the transmit duty cycle of the WLAN transceiver.

21 Claims, 7 Drawing Sheets

EFFECTING CHANGE TO TRANSMIT DUTY CYCLE OF WLAN TRANSCEIVER

TECHNICAL FIELD

This disclosure is related generally to an apparatus having a wireless local area network (WLAN) transceiver, and more specifically to techniques for mitigating emissions from the RF components of the WLAN transceiver and any co-located additional wireless transceivers.

BACKGROUND

Specific Absorption Rate (SAR) is a measure of the rate of radio frequency (RF) energy absorption by the body from a wireless communication device. SAR provides a straightforward means for measuring the RF exposure characteristics of wireless communication devices to ensure that they are within safety guidelines set by regulatory bodies such as the Federal Communications Commission (FCC).

In order to determine compliance, a wireless communication device is tested while operating at its highest transmit power level in all the frequency bands in which it operates, and in various specific positions against a dummy head and body, to simulate the way different users typically make use of the device. Currently, rules from most regulatory bodies require reductions in transmit power as the only means to ensure compliance.

However, reducing transmit power may result in link instability or disconnection.

BRIEF DESCRIPTION OF THE DRAWINGS

FIG. 2-1 and FIG. 2-2 illustrate alternative example methods to be implemented by a mitigation manager;

FIG. 3-1 and FIG. 3-2 illustrate alternative example methods for handling an indication of a mitigation level.

DETAILED DESCRIPTION

Figure 1:
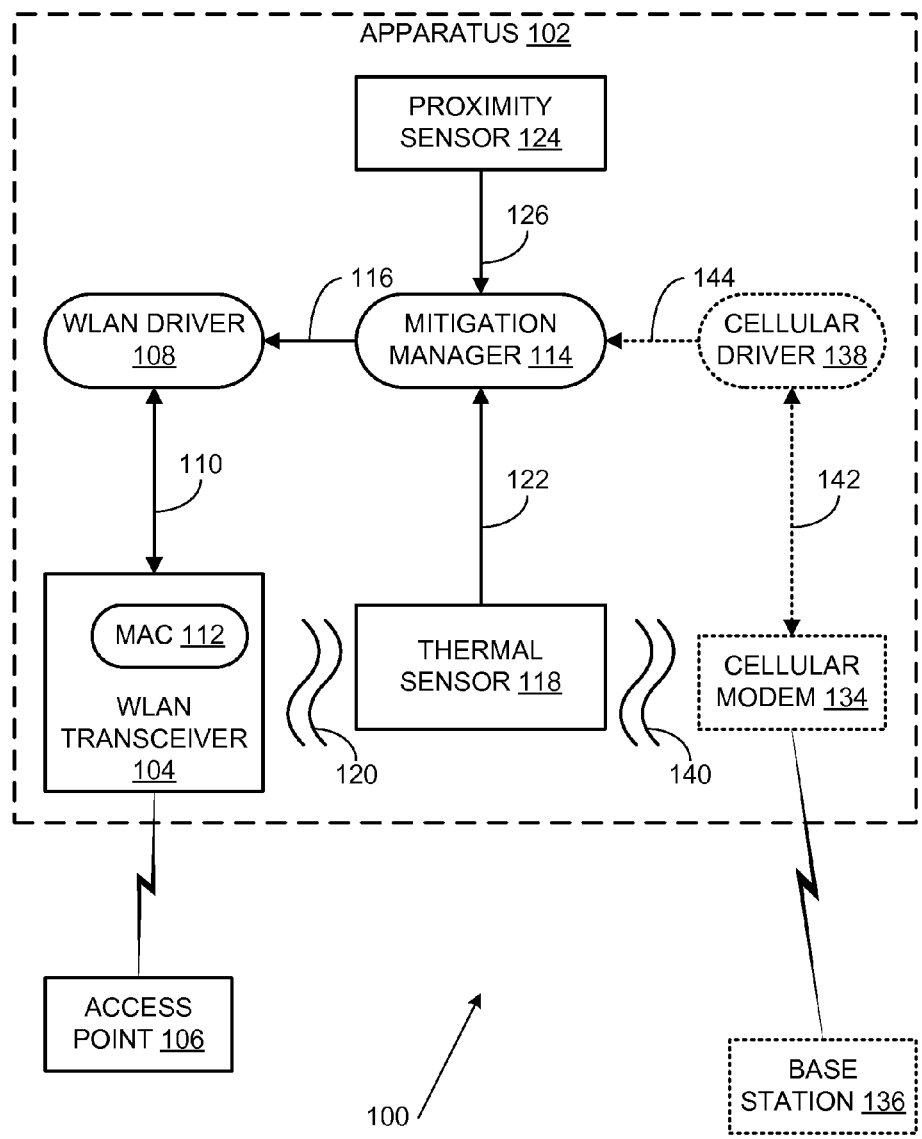
FIG. 1 is an illustration of an example network architecture involving an apparatus having a wireless local area network (WLAN) transceiver.

In an apparatus having a wireless local area network (WLAN) transceiver, there are radio frequency (RF) emissions from the radio.

A proximity sensor internal to the apparatus may indicate proximity of the apparatus to a particular body part of a human, for example a head or a lap. Concerns regarding meeting safety guidelines may be higher when the proximity sensor indicates proximity to the particular body part than when the proximity sensor indicates no proximity.

A thermal sensor internal to the apparatus may be positioned proximate to the WLAN transceiver to sense thermal energy. Assuming no other sources of RF emissions in the apparatus, the level of RF emissions is positively correlated to the transmit power and the transmit duty cycle of the WLAN transceiver. The temperature output by the thermal sensor is generally indicative of the level of RF emissions. Aside from concerns regarding meeting safety guidelines, the output of the thermal sensor may be indicative of the risk of thermal damage to internal components of the apparatus.

Although the temperature and proximity cannot be directly controlled, this document proposes setting configuration parameters of a MAC layer of the WLAN transceiver to effect changes to the transmit duty cycle of the WLAN transceiver. All else being unchanged, reducing the transmit duty cycle of the WLAN transceiver is expected to reduce the temperature sensed by the thermal sensors and the RF emissions of the apparatus as a whole, because the WLAN transceiver's power amplifier and other components generating thermal energy are in use for less time.

The apparatus may include one or more additional wireless transceivers, for example a wireless personal area network (WPAN) transceiver or a cellular modem. A thermal sensor may be positioned proximate to the additional wireless transceiver to sense thermal energy. The level of RF emissions is positively correlated to the transmit power and the transmit duty cycle of the additional wireless transceivers.

In practice, the transmit power and transmit duty cycle of the additional wireless transceiver are dynamic and not fixed, and the transmit power of the WLAN transceiver is dynamic and not fixed. Thus reducing the transmit duty cycle of the WLAN transceiver effected by making particular MAC-layer configuration changes to the WLAN transceiver may not actually reduce the temperature sensed by the thermal sensors or the RF emissions of the apparatus as a whole. Accordingly, this document proposes monitoring the output of the one or more sensors and state information for the additional wireless transceiver, determining an applicable mitigation level as a function of the output of the sensors and the state information, and making particular MAC-layer configuration changes to the WLAN transceiver to effect changes in the transmit duty cycle of the WLAN transceiver, where the particular MAC-layer configuration changes correspond to the applicable mitigation level that has been determined.

If the applicable mitigation level is indicative of temperature and RF emissions at satisfactory levels, the MAC-layer configuration changes to the WLAN transceiver do not impose any particular constraints on the transmit duty cycle of the WLAN transceiver. If the mitigation level is indicative of temperature or RF emissions at levels warranting concern, then the MAC-layer configuration changes to the WLAN transceiver may effect a significantly reduced transmit duty cycle of the WLAN transceiver. For intermediate mitigation levels, the MAC-layer configuration changes to the WLAN transceiver may effect minor changes to the transmit duty cycle of the WLAN transceiver.

FIG. 1 is an illustration of an example network architecture 100 involving an apparatus 102 having a wireless local area network (WLAN) transceiver 104 compatible with one or more WLAN technologies.

The WLAN transceiver 104 is operable to connect to a wireless access point (AP) 106 that is compatible with one or more of the one or more WLAN technologies. For example, such technologies may include, or be based on, any one or any combination of the IEEE 802.11 family of WLAN standards (as described in IEEE Std. 802.11™-2012 published 29 Mar. 2012 by IEEE Computer Society). The term "Wi-Fi®" refers to interoperable implementations of the IEEE 802.11 family of WLAN standards certified by the Wi-Fi Alliance.

A WLAN driver 108 is installed in the apparatus 102, to enable control and monitoring of the WLAN transceiver 104, as illustrated by an arrow 110. A medium access control (MAC) layer 112 of the WLAN transceiver 104 is implemented in software and is configurable through the setting of various MAC-layer parameters. Some of the MAC-layer parameters, such as interframe spacing parameters and back-off parameters, are timing parameters that affect the transmit duty cycle of the WLAN transceiver 104. For example, increases in the duration of these timing parameters increases the time that the transmitter of the WLAN transceiver 104 is off, thus reducing the transmit duty cycle of the WLAN transceiver 104.

A mitigation manager 114 in the apparatus 102 determines a "mitigation level" that is applicable to the apparatus 102. Further details about how the applicable mitigation level is determined are described with respect to FIG. 3. An indication of the applicable mitigation level, as determined by the mitigation manager 114, is provided to the WLAN driver 108, as illustrated by an arrow 116. Each mitigation level corresponds to a particular set of MAC-layer configuration changes to the WLAN transceiver. Responsive to being provided the indication of the applicable mitigation level, the WLAN driver 108 may adjust settings of configuration parameters of the MAC layer 112 to effect a change in the transmit duty cycle of the WLAN transceiver 104. Further details about how the WLAN driver 108 handles the indication of the applicable mitigation level are described with respect to FIG. 4.

The apparatus 102 has one or more sensors, and the mitigation manager 114 determines the applicable mitigation level as a function of output from the one or more sensors.

The one or more sensors may include, for example, a thermal sensor 118 positioned proximate to components of the WLAN transceiver 104 that generate thermal energy (figuratively illustrated by curves 120). Such components may include, for example, a power amplifier of the WLAN transceiver 104. Output of the thermal sensor 118 may be read by a processor (not shown) and provided, as illustrated by an arrow 122, to the mitigation manager 114. The output of the thermal sensor 118 may be processed (for example, filtered and/or averaged) by the processor before being provided to the mitigation manager 114.

The one or more sensors may include, for example, one or more proximity sensors 124 operative to detect that the apparatus 102 is positioned proximate to a human, or proximate to a particular body part of the human, for example, to a head or a lap. Output of the proximity sensors 124 may be read by a processor (not shown) and provided, as illustrated by an arrow 126, to the mitigation manager. The output of the proximity sensors 124 may be processed by the processor before being provided to the mitigation manager 114.

The apparatus 102 may optionally have one or more additional wireless transceivers capable of producing radio frequency (RF) emissions, for example, a cellular modem 134 compatible with one or more cellular network technologies or a wireless personal area network (WPAN) transceiver (not shown).

The cellular modem 134 is operable to connect to a wireless base station 136 that is compatible with one or more of the one or more cellular network technologies. For example, such technologies may include, or be based on, Code Division Multiple Access (CDMA), Global System for Mobile communications (GSM), General Packet Radio Service (GPRS), Enhanced Data rates for GSM Evolution (EDGE), Universal Mobile Telecommunications System (UMTS®), High Speed Packet Access (HSPA), Evolved HSPA (HSPA+), Long-Term Evolution (LTE), or LTE-Advanced.

If the apparatus 102 includes the cellular modem 134, the thermal sensor 118 may be positioned proximate to components of the cellular modem 134 that generate thermal energy (figuratively illustrated by curves 140). Such components may include, for example, a power amplifier of the cellular modem 134. There may be a single thermal sensor positioned proximate to the WLAN transceiver 104 and to the cellular modem 134. Alternatively, there may be a thermal sensor positioned proximate to the WLAN transceiver 104 and another thermal sensor positioned proximate to the cellular modem 134.

If the apparatus 102 includes the cellular modem 134, a cellular driver 138 is installed in the apparatus 102, to enable control and monitoring of the cellular modem 134, as illustrated by an arrow 142. State information regarding the cellular modem 134, obtained via the monitoring function of the cellular driver 138, is provided to the mitigation manager 114, as illustrated by an arrow 144. The state information may include, for example, any one or any combination of the following: an indication of the type of cellular network with which the cellular modem 134 is connected, an indication of the cellular duty cycle of the cellular modem 134, an indication of the cellular transmit power of the cellular modem 134, and an on/off indication whether the cellular modem 134 is currently transmitting. The mitigation manager 114 determines the applicable mitigation level as a function of the state information.

Figures 1, 2:
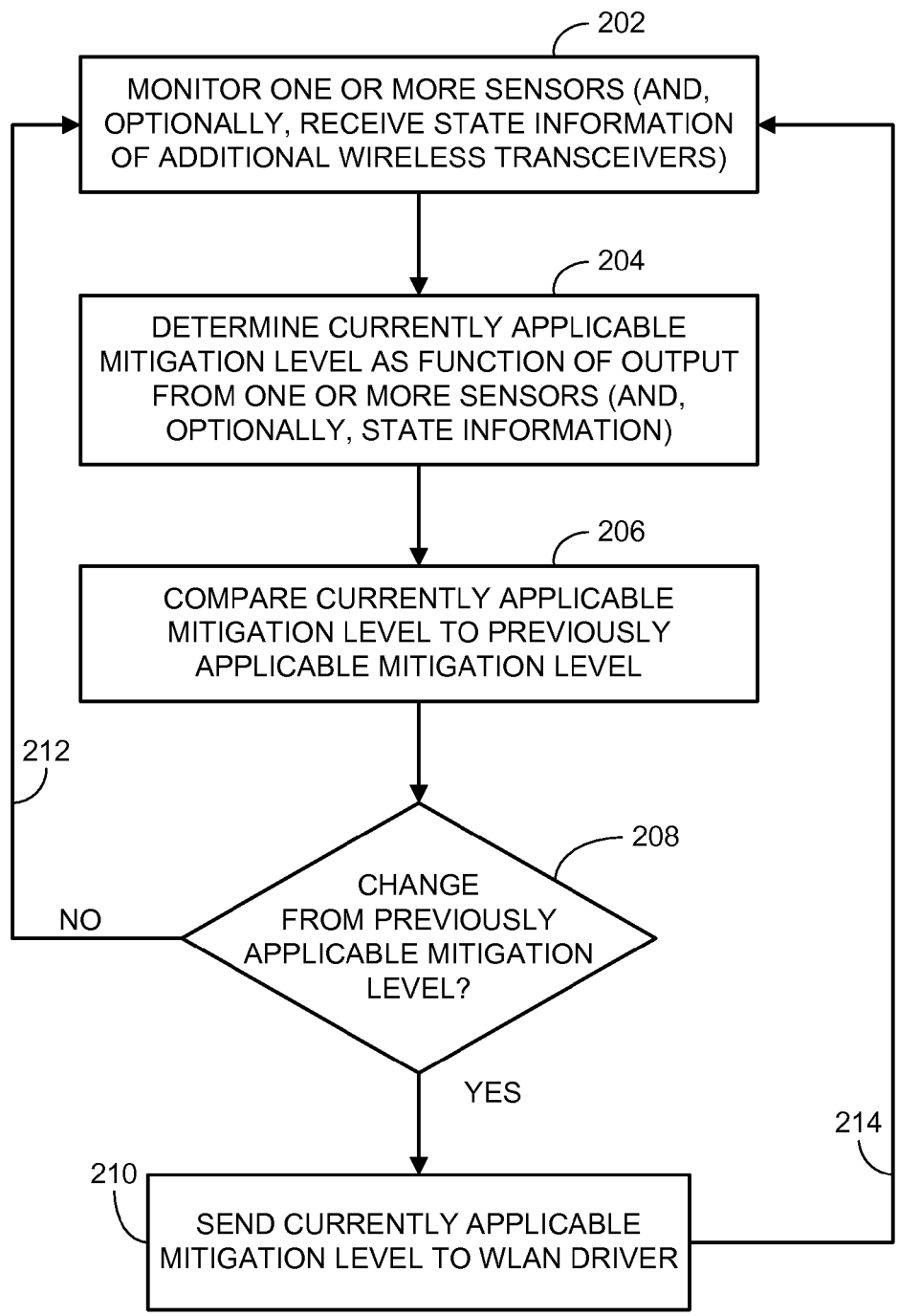
Figure 2:
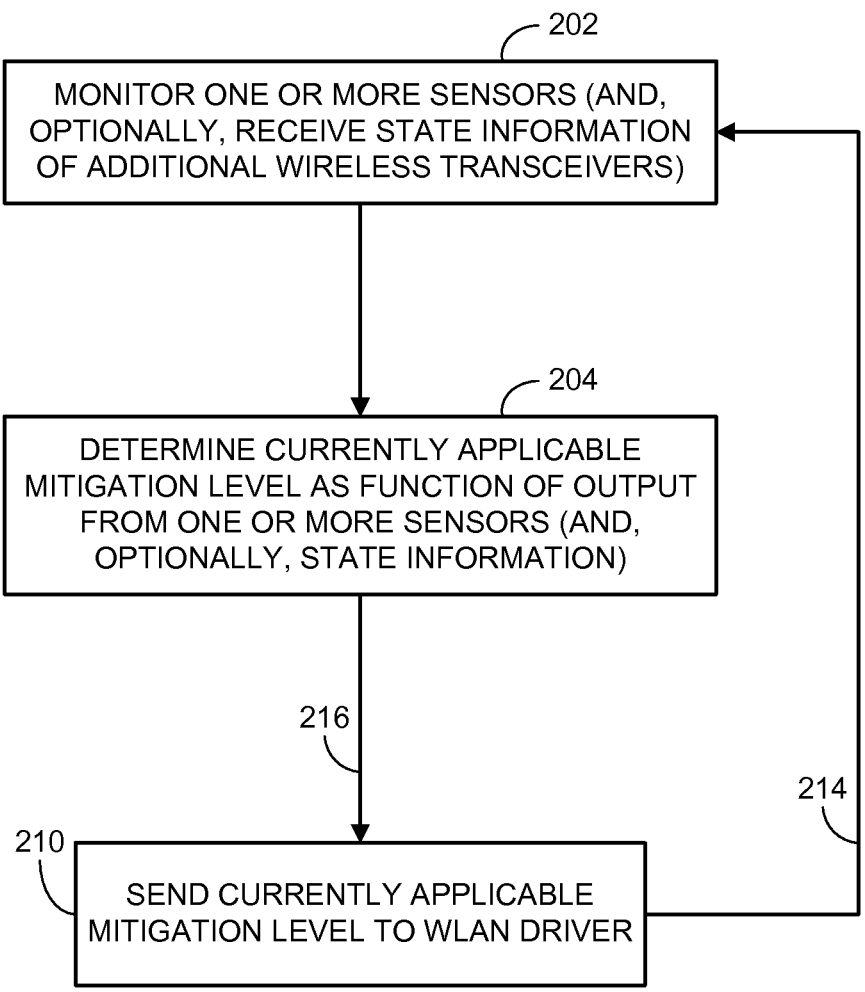

An example method to be implemented by the mitigation manager 114 is illustrated in FIG. 2-1. At 202, the mitigation manager 114 monitors the one or more sensors. At 204, the mitigation manager 114 determines the mitigation level that is currently applicable to the apparatus 102. This determination by the mitigation manager 114 of the applicable mitigation level occurs from time to time. For example, the mitigation manager 114 may poll from time to time for output of the sensors (and, if appropriate, for state information of any additional wireless transceivers) from time to time, and then determine the applicable mitigation level. In another example, the mitigation manager 114 may wait at 202 to be provided updates of the (possibly processed) output of the thermal sensor 118 and/or the (possibly processed) output of the proximity sensors 123 (and/or, if appropriate, the state information of any additional wireless transceivers), and may determine the applicable mitigation level responsive to receiving the updates.

At 206, responsive to determining the currently applicable mitigation level, the mitigation manager 114 compares the currently applicable mitigation level to the most recent previously applicable mitigation level. If there is no change in the mitigation level, as checked at 208, then as indicated by an arrow 212 the mitigation manager 114 again monitors at 202 the one or more sensors. If the mitigation level has changed, as checked at 208, the mitigation manager 114 causes an indication of the currently applicable mitigation level to be provided to the WLAN driver 108 at 210, and then as indicated by an arrow 214 again monitors at 202 the one or more sensors.

In an alternative example method, illustrated in FIG. 2-2, the mitigation manager 114 may cause an indication of the currently applicable mitigation level to be provided to the WLAN driver 108 at 210 responsive to determining at 204 the currently applicable mitigation level, as indicated by an arrow 216, without comparing the currently applicable mitigation level to the previously applicable mitigation level.

As noted above, each of the multiple mitigation levels corresponds to particular set of MAC-layer configuration changes to the WLAN transceiver. In the following discussion, the example of four mitigation levels {0, 1, 2, 3} is used. In other examples, there may be only two or three mitigation levels, or there may be more than four mitigation levels. The greater the number of mitigation levels, the greater the number of sets of MAC-layer configuration changes that can be applied to the WLAN transceiver to effect changes to the transmit duty cycle of the WLAN transceiver. As discussed in more detail herein, the highest mitigation level may correspond to an aggressive course of action to significantly reduce the transmit duty cycle of the WLAN transceiver 104, and the lowest mitigation level may correspond to not imposing any additional constraints on the transmit duty cycle of the WLAN transceiver 104.

As mentioned above, the mitigation manager 114 determines the applicable mitigation level as a function of the output of the one or more sensors. Various examples are illustrated below, simply to illustrate certain concepts. Other methods for determining (as a function of the output of the one or more sensors) which mitigation level applies may be used instead.

For example, the mitigation manager 114 may determine the mitigation level solely as a function of temperature, as listed in Table 1:

TABLE 1

| Mitigation Level (ML) | Temperature T threshold conditions |
|---|---|
| ML = 3 if | (45° C. ≤ T) |
| else ML = 2 if | (35° C. ≤ T < 45° C.) |
| else ML = 1 if | (30° C. ≤ T < 35° C.) |
| else ML = 0 | (T < 30° C.) |

In another example, where the apparatus 102 includes the thermal sensor 118 and the proximity sensor 124, the mitigation manager 114 may determine the mitigation level as a function of temperature and proximity, as listed in Table 2:

TABLE 2

| Mitigation Level (ML) | Temperature T and proximity conditions |
|---|---|
| ML = 3 if | (45° C. ≤ T) AND close proximity to body part |
| else ML = 2 if | (35° C. ≤ T < 45° C.) AND close proximity to body part |
| else ML = 1 if | (30° C. ≤ T < 35° C.) AND close proximity to body part |
| else ML = 0 | (T < 30° C.) OR no proximity to body part |

For example, if output of the proximity sensor 124 indicates no proximity to a body part of interest (for example, a head or a lap) of a human, then the mitigation manager 114 determines an applicable mitigation level of 0. If output of the proximity sensor 124 indicates proximity to a body part of interest of a human, then the mitigation manager 114 determines the applicable mitigation level based on the output of the thermal sensor 118.

In yet another example, where the apparatus 102 includes the thermal sensor 118 and the cellular modem 134, the mitigation manager 114 may determine the mitigation level as a function of temperature and whether the cellular modem 134 is currently transmitting, as listed in Table 3:

TABLE 3

| Mitigation Level (ML) | Temperature T and Cellular TX on/off conditions |
|---|---|
| ML = 3 if | (45° C. ≤ T) AND (cellular TX = on) |
| else ML = 2 if | (35° C. ≤ T < 45° C.) AND (cellular TX = on) |
| else ML = 1 if | (30° C. ≤ T < 35° C.) AND (cellular TX = on) |
| else ML = 0 | (T < 30° C.) OR (cellular TX = on) |

In a further example, where the apparatus 102 includes the thermal sensor 118 and the cellular modem 134, the mitigation manager 114 may determine the mitigation level as a function of the cellular transmit power, the cellular duty-cycle, and the temperature, as listed for the case of LTE in Table 4:

TABLE 4

| Mitigation Level (ML) | Cellular Tx Power P and Cellular Transmit Duty-Cycle D and Temperature T conditions |
|---|---|
| ML = 3 if | (21 dBm ≤ P) OR (80% ≤ D) OR (45° C. ≤ T) |
| else ML = 2 if | (19 dBm ≤ P < 21 dBm) OR (70% ≤ D < 80%) OR (35° C. ≤ T < 45° C.) |
| else ML = 1 if | (15 dBm ≤ P < 19 dBm) OR (50% ≤ D < 70%) OR (30° C. ≤ T < 35° C.) |
| else ML = 0 | (P < 15 dBm) AND (D < 50%) AND (T < 30° C.) |

For example, if the cellular network type is LTE, the cellular transmit power P is 16 dBm, the cellular transmit duty-cycle is 48% and the temperature is 29° C., the mitigation manager 114 determines that the applicable mitigation level is 1.

In another example, if the cellular network type is LTE, the cellular transmit power P is 18 dBm, the cellular transmit duty-cycle is 76% and the temperature is 34° C., the mitigation manager 114 determines that the applicable mitigation level is 2.

Different cellular network types have different traffic and power spectrum profiles, which translate to different contributions to thermal energy. Accordingly, it is expected that the function used by the mitigation manager 114 to determine the mitigation type as a function of temperature, cellular transmit power, and cellular the set of threshold conditions relating to transmit power and transmit duty cycle for one cellular network type will differ from the set of threshold conditions relating to transmit power and transmit duty cycle for another cellular network type.

Figures 1, 3:
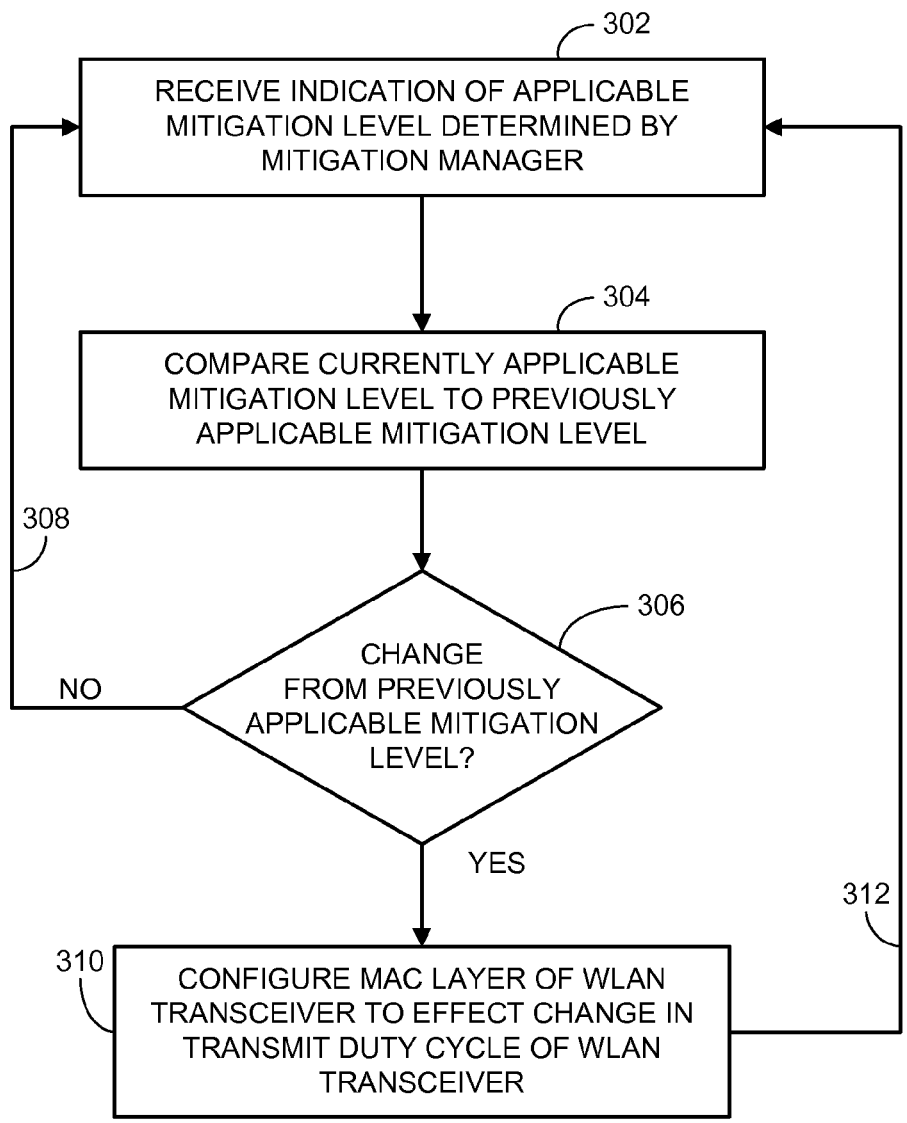
Figures 2, 3:
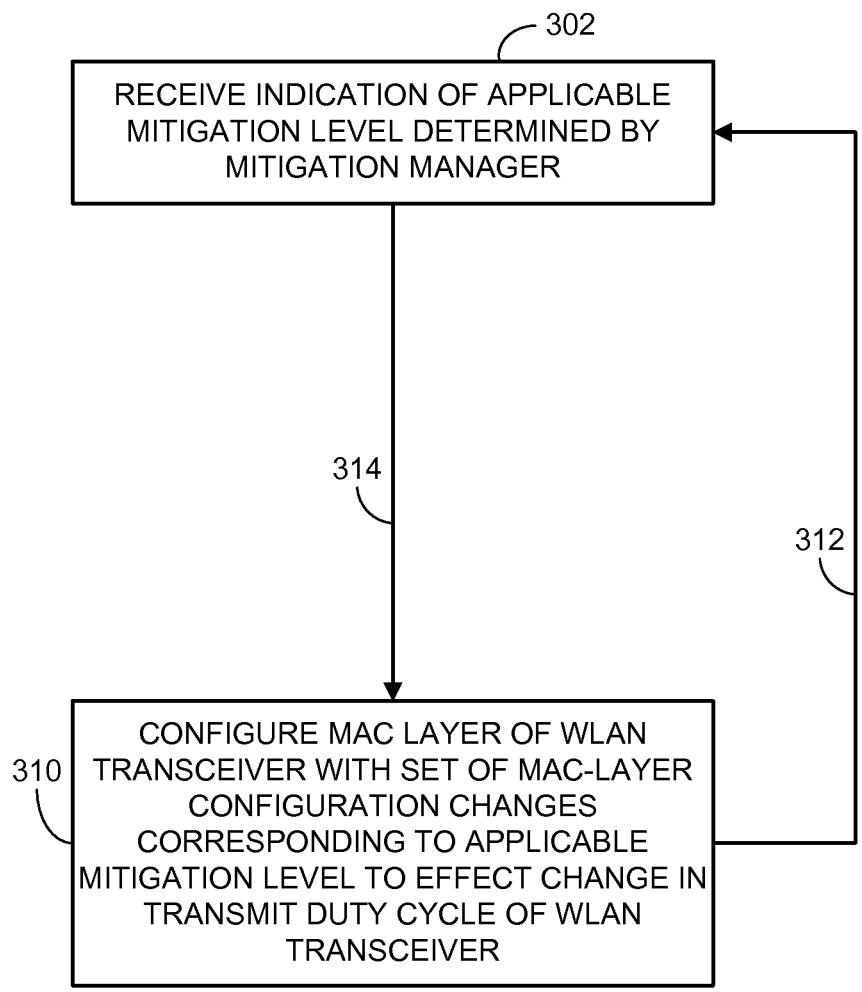

FIG. 3-1 illustrates an example method for handling an indication of a mitigation level, the method to be implemented by the WLAN driver 108. At 302, the WLAN driver 108 receives the indication of the applicable mitigation level determined by the mitigation manager 114. Responsive to receiving the indication of the applicable mitigation level, the WLAN driver 108 compares at 304 the received applicable mitigation level to the most recent previously applicable mitigation level. If there is no change in the mitigation level, as checked at 306, then the WLAN driver 108 waits, as indicated by an arrow 308, until a next indication of applicable mitigation level determined by the mitigation manager is received at 302. If the mitigation level has changed, as checked at 306, the WLAN driver 108 configures at 310 the MAC layer 112 of the WLAN transceiver 104 with the set of MAC-layer configuration changes that corresponds to the applicable mitigation level, to effect a change in the transmit duty cycle of the WLAN transceiver 104, and then as indicated by an arrow 312 waits until a next indication of applicable mitigation level determined by the mitigation manager is received at 302.

In an alternative example method, illustrated in FIG. 3-2, the WLAN driver 108 may configure the MAC layer 112 at 310 responsive to receiving at 302 the indication of the applicable mitigation level, as indicated by an arrow 314, without comparing the currently applicable mitigation level to the previously applicable mitigation level.

Various techniques to affect the transmit duty cycle of the WLAN transceiver 104 are suggested in this document.

Technique a: Indicate Power-Save Mode on Every Uplink Data Frame

Coarse tuning of the transmit duty cycle of the WLAN transceiver may be effected through imposition of certain power management characteristics/features. As this is an aggressive course of action that is expected to significantly reduce the transmit duty cycle of the WLAN transceiver 104, this technique may be an appropriate choice when the highest mitigation level is applicable to the apparatus 102.

Power management techniques are described in section 10.2 of Std 802.11™-2012. When a station (STA) transmits to an AP an uplink data frame that indicates that the STA is operating in a power-save mode, the AP will respond with a downlink frame, and the STA will not transmit another uplink data frame to the AP until after the STA receives that downlink frame from the AP. This has the effect of reducing the transmit duty cycle of the STA—even if the STA does not actually power down any of its components—because the STA transmits only one uplink data frame at a time and must wait for a downlink frame from the AP before transmitting a next uplink data frame.

Thus having the WLAN driver 108 configure the MAC layer 112 of the WLAN transceiver 104 to indicate in every uplink data frame that the WLAN transceiver 104 is operating in power-save mode may result in a significant decrease in the transmit duty cycle of the WLAN transceiver 104, even if the WLAN transceiver 104 does not actually power down any of its components. For example, if the uplink data frames sent by the WLAN transceiver 104 and the downlink frames sent by the AP 110 are the same size and are sent at the same data rate, then implementing this mitigation technique of indicating power-save mode in each uplink data frame will reduce the transmit duty cycle of the WLAN transceiver 104 to 50%. The WLAN driver 108 may configure the MAC layer 112 of the WLAN transceiver 104 to set the Power Management subfield in the Frame Control field of every uplink data frame to the bit-value 1 (one).

Technique B: Change Interframe Spacing Parameters

Fine tuning of the transmit duty cycle of the WLAN transceiver 104 may be effected through changes to interframe spacing parameters. How this technique is applied will depend on whether Quality of Service (QoS) functionality is currently enabled in the WLAN transceiver 104. The WLAN transceiver 104 will be denoted non-QoS STA if the apparatus 102 is a legacy station incapable of implementing QoS functionality, or if the apparatus 102, despite the WLAN transceiver 104 being capable of implementing QoS functionality, is currently connected to an AP that has not turned on (that is, activated or enabled) QoS functionality for the WLAN that the WLAN transceiver 104 has joined. The WLAN transceiver 104 will be denoted QoS STA if the WLAN transceiver 104 is capable of implementing QoS functionality and is currently connected to an AP that has turned on (that is, activated or enabled) QoS functionality for the WLAN that the WLAN transceiver 104 has joined.

A carrier sense multiple access with collision avoidance (CSMA/CA) access method known as Distributed Coordination Function (DCF), described in section 9.2.2 of Std 802.11™-2012, mandates that a transmitting STA must verify that the wireless medium is idle for a minimum specified duration before attempting to transmit. The minimum specified duration is denoted DCF InterFrame Space (DIFS). Increasing the DIFS may reduce the transmit duty cycle of a non-QoS STA, because the STA is required to verify that the wireless medium is idle for a longer duration before attempting to transmit. Decreasing the DIFS may increase the transmit duty cycle of the STA, because the STA is required to verify that the wireless medium is idle for a shorter duration before attempting to transmit.

The DIFS is calculated as follows:

$$\text{DIFS} = \text{SIFS} + \text{DIFS}n \times \text{SlotTime} \quad [\text{Eqn. 1}]$$

where SIFS is the Short InterFrame Space, the SlotTime is a duration of a slot, and DIFSn is an integer value whose default value is 2.

Thus having the WLAN driver 108 configure the WLAN transceiver 104 of the non-QoS STA with a DIFSn value of 4 may slightly reduce the transmit duty cycle compared to when the WLAN transceiver 104 is configured with the default DIFSn value of 2. Likewise, having the WLAN driver 108 configure the WLAN transceiver 104 of the non-QoS STA with a DIFSn value of 15 may slightly reduce the transmit duty cycle compared to when the WLAN transceiver 104 is configured with a DIFSn value of 4.

A transmitting QoS STA must verify that the wireless medium is idle for an access-category-dependent minimum specified duration before attempting to transmit. The minimum specified duration is denoted Arbitration InterFrame Space (AIFS). The AIFS[ac] for the access category ac is calculated as AIFSN[ac] multiplied by the duration of a single time slot, where AIFSN stands for AIFS number, and is an integer value between 0 and 15.

$$\text{AIFS}[ac] = \text{AIFSN}[ac] \times \text{SlotTime} \quad [\text{Eqn. 2}]$$

Increasing the AIFSN for a particular access category may reduce the transmit duty cycle of a QoS STA, because the QoS STA is required to verify that the wireless medium is idle for a longer duration before attempting to transmit frames from the queue for that access category. Decreasing the AIFSN for a particular access category may increase the transmit duty cycle of the STA, because the STA is required to verify that the wireless medium is idle for a shorter duration before attempting to transmit from the queue for that access category.

Thus having the WLAN driver 108 configure the WLAN transceiver 104 of the QoS STA with an increment of 3 (for example) to the AIFSN[ac] values assigned by the AP may slightly reduce the transmit duty cycle compared to when the WLAN transceiver 104 is configured with the AIFSN[ac] values assigned by the AP. Likewise, having the WLAN driver 108 configure the WLAN transceiver 104 of the QoS STA with maximal AIFSN[ac] values of 15 may slightly reduce the transmit duty cycle compared to when the WLAN transceiver 104 is configured with an increment of 3 (for example) to the AIFSN[ac] values assigned by the AP.

Technique C: Adjusting Back-Off Parameters

An aspect of DCF is that in the event of a collision, the STA chooses a random back-off number between CWmin and CWmax, and then waits a back-off duration (equal to a slot duration multiplied by the random back-off number) before again attempting to transmit. If that next attempt is unsuccessful, the STA then waits twice that duration before again attempting to transmit.

Increasing CWmin may have the effect of reducing the transmit duty cycle of the STA, because the back-off duration that the STA waits (after an unsuccessful attempt to transmit) before attempting again to transmit is longer. Decreasing CWmin may have the effect of increasing the transmit duty cycle of the STA, because the back-off duration that the STA waits (after an unsuccessful attempt to transmit) before attempting again to transmit is shorter.

Thus having the WLAN driver 108 configure the WLAN transceiver 104 with CWmin=64 may slightly reduce the transmit duty cycle compared to when the WLAN transceiver 104 is configured with CWmin=31. Likewise, having the WLAN driver 108 configure the WLAN transceiver 104 with CWmin=256 may slightly reduce the transmit duty cycle compared to when the WLAN transceiver 104 is configured with CWmin=64.

Technique D: Faking Collisions

As noted above, a STA that has experienced a collision while attempting to transmit will wait a random back-off duration before again attempting to transmit. Waiting a random back-off duration even when no collision has occurred may have the effect of reducing the transmit duty cycle of the STA, because the STA waits after successful transmissions before attempting a further transmission.

Thus having the WLAN driver 108 configure the WLAN transceiver 104 to fool its MAC layer 112 into reacting as though a collision has occurred, even when the WLAN transceiver 104 has transmitted without collisions, may reduce the transmit duty cycle.

Thus the WLAN driver 108 may configure the MAC layer 112 with the set of MAC-layer configuration changes that correspond to the applicable mitigation level in accordance with any one or any combination of these techniques or other suitable techniques.

Examples of mitigation levels and sets of MAC-layer configuration changes to effect changes in the transmit duty cycle of the WLAN transceiver 104 are provided in the following tables:

TABLE 5

| Mitigation Level | Techniques A and B (QoS) | Techniques A and B (non-QoS) |
|---|---|---|
| 3 | indicate PS mode (in Frame Control field) in every UL data frame | indicate PS mode (in Frame Control field) in every UL data frame |
| 2 | set AIFSN[ac] = 15 | set DIFSn = 15 |
| 1 | set AIFSN[ac] = AIFSN[ac]$_{AP}$ + 3 | set DIFSn = 4 |
| 0 | set AIFSN[ac] = AIFSN[ac]$_{AP}$ | set DIFSn = 2 |

TABLE 6

| Mitigation Level | Techniques A and C |
|---|---|
| 3 | indicate PS mode (in Frame Control field) in every UL data frame |
| 2 | set CWmin = 256 |
| 1 | set CWmin = 64 |
| 0 | set CWmin = 31 |

TABLE 7

| Mitigation Level | Techniques A, B (QoS) and C | Techniques A, B (non-QoS) and C |
|---|---|---|
| 3 | indicate PS mode (in Frame Control field) in every UL data frame | indicate PS mode (in Frame Control field) in every UL data frame |
| 2 | set AIFSN[ac] = 15 and CWmin = 256 | set DIFSn = 15 and CWmin = 256 |
| 1 | set AIFSN[ac] = AIFSN[ac]$_{AP}$ + 3 and CWmin = 64 | set DIFSn = 4 and CWmin = 64 |
| 0 | set AIFSN[ac] = AIFSN[ac]$_{AP}$ and CWmin = 31 | set DIFSn = 2 and CWmin = 31 |

Figure 4:
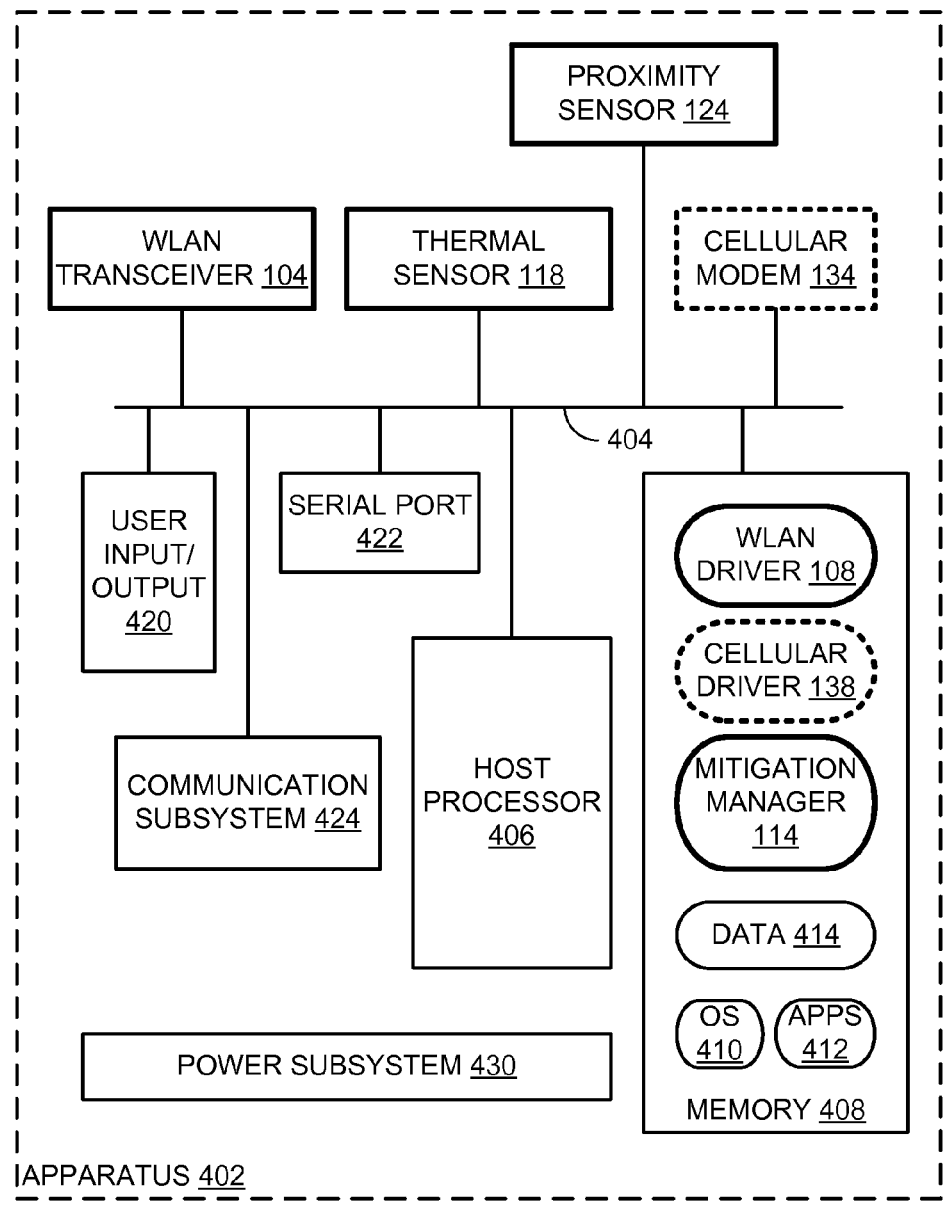
FIG. 4 and FIG. 5 illustrate example functional block diagrams of example apparatuses.

FIG. 4 is an example functional block diagram of an example apparatus 402. The apparatus 402 is an example of apparatus 102. The apparatus 402 has an internal bus 404 to which the WLAN transceiver 104 and the one or more sensors (for example, the thermal sensor 118 and/or the proximity sensor 124) are coupled. If the apparatus 402 includes the cellular modem 134, then the cellular modem 134 is coupled to the internal bus 404. The apparatus 402 comprises at least one host processor 406 coupled to the internal bus 404 and a memory 408 coupled to the internal bus 404. The memory 408 stores an operating system 410, various applications 412, and data 414 for use by the operating system 410 or by the various applications 412 or by both. The memory 408 also stores the WLAN driver 108 and the mitigation manager 114, and if appropriate, the cellular driver 138.

The host processor 406 reads the output of the one or more sensors, optionally processes the output, and provides the (possibly processed) output to the mitigation manager 114, which is executed by the host processor 406. If appropriate, the host processor 406 obtains the state information for the cellular modem 134 via the cellular driver 138, which is executed by the host processor 406, and provides the state information to the mitigation manager 114. The applicable mitigation level determined by the mitigation manager 114 is provided by the host processor 406 to the WLAN driver 108, which is executed by the host processor 406.

The apparatus 402 may comprise one or more user input/output components 420 are coupled to the internal bus 404. A non-exhaustive list of examples for the user input/output components 420 includes a display screen, a touch screen, an optical pad, a keyboard, a keypad, pressable buttons, a trackball, a trackpad, a thumbwheel, a microphone, a speaker, and the like. The apparatus 402 may optionally comprise one or more serial ports 422 (for example, universal serial bus (USB) or micro-USB ports) coupled to the internal bus 404. The apparatus 402 may optionally comprise one or more additional communication subsystems 424, for example, a wired communication subsystem, a wireless personal area network communication subsystem, a near field communications (NFC) subsystem, a global positioning system (GPS) subsystem, and the like.

The apparatus 402 comprises a power subsystem 430 that supplies power to the various electronic components in the apparatus 402. The power subsystem 430 may be any form of power supply, such as a conventional rechargeable battery (removable or non-removable), a fuel cell system, a solar cell, or the like, or any combination thereof. The apparatus 402 in some implementations may be electrically connectable to a fixed power supply such as a wall outlet. However, in those cases where the power subsystem 430 supports the portability of the apparatus 402, the apparatus 402 effectively comprises a mobile wireless communication device.

The apparatus 402 may comprise other components that are not illustrated in FIG. 4 so as not to obscure the description of the concepts of interest.

Figure 5:
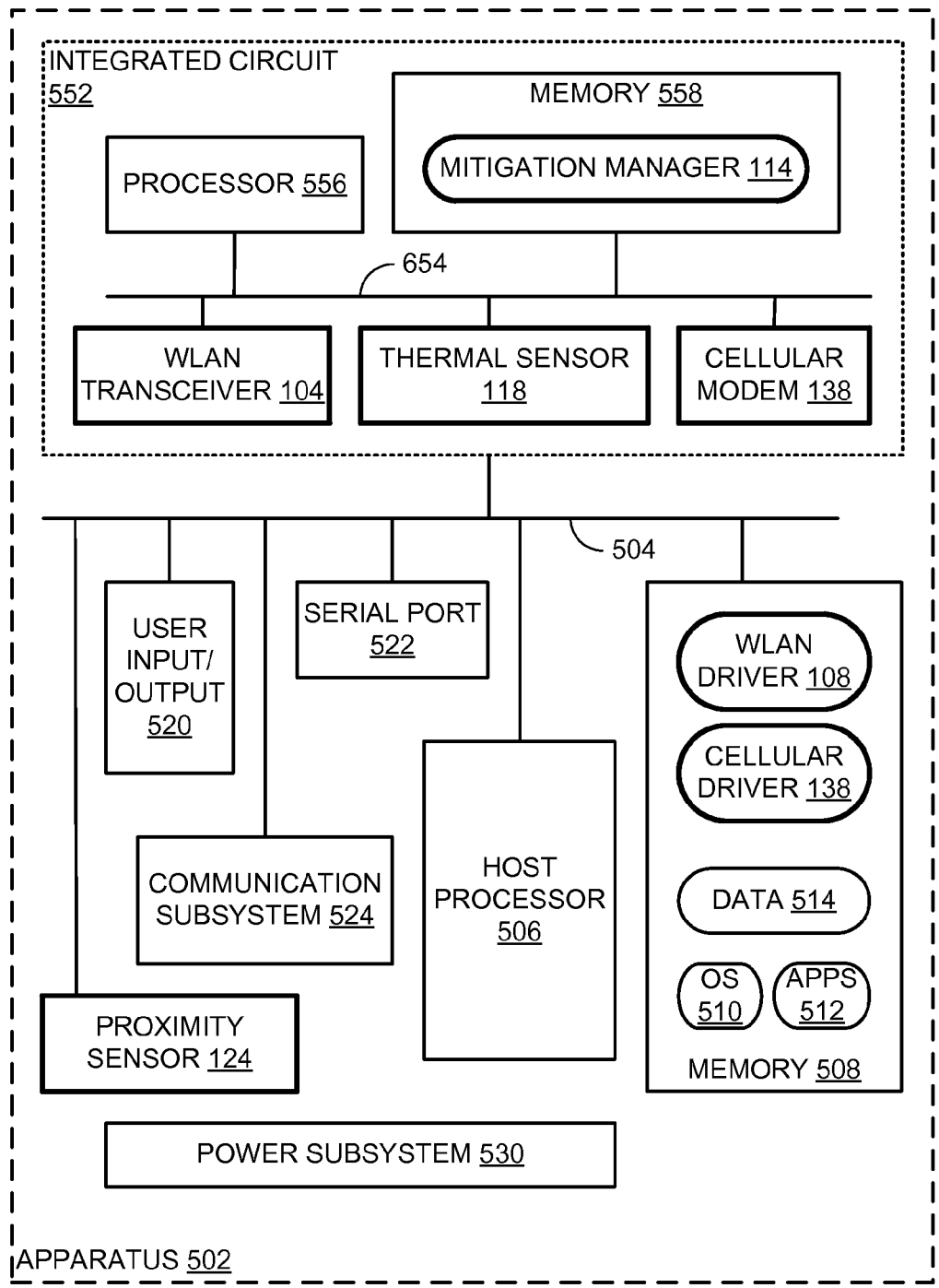

FIG. 5 is an example functional block diagram of an example apparatus 502. The apparatus 502 is another example of apparatus 102. The apparatus 502 has an internal bus 504 to which an integrated circuit 552 is coupled. The apparatus 502 comprises at least one host processor 506 coupled to the internal bus 504 and a memory 508 coupled to the internal bus 504. The memory 508 stores an operating system 510, various applications 512, and data 514 for use by the operating system 510 or by the various applications 512 or by both. The memory 508 also stores the WLAN driver 108 and the cellular driver 138. The proximity sensor 124 is coupled to the internal bus 504.

The integrated circuit 552 has an internal bus 554, to which the WLAN transceiver 104, the cellular modem 138, and the one or more thermal sensors 120 are coupled. The integrated circuit 552 comprises at least one processor 556 coupled to the internal bus 554 and a memory 558 coupled to the internal bus 554. The memory 558 stores the mitigation manager 114.

The processor 556 reads the output of the one or more thermal sensors 120, optionally process the output, and provides the (possibly processed) output to the mitigation manager 114, which is executed by the processor 556. The host processor 506 obtains the state information for the cellular modem 134 via the cellular driver 138, which is executed by the host processor 506, and provides the state information to the mitigation manager 114. The applicable mitigation level determined by the mitigation manager 114 is provided by the host processor 506 to the WLAN driver 108, which is executed by the host processor 506.

The apparatus 502 comprises one or more user input/output components 520 are coupled to the internal bus 504. A non-exhaustive list of examples for the user input/output components 520 includes a display screen, a touch screen, an optical pad, a keyboard, a keypad, pressable buttons, a trackball, a trackpad, a thumbwheel, a microphone, a speaker, and the like. The apparatus 502 may optionally comprise one or more serial ports 522 (for example, universal serial bus (USB) or micro-USB ports) coupled to the internal bus 504. The apparatus 502 may optionally comprise one or more additional communication subsystems 524, for example, a wired communication subsystem, a wireless personal area network communication subsystem, a near field communications (NFC) subsystem, a global positioning system (GPS) subsystem, and the like.

The apparatus 502 comprises a power subsystem 530 that supplies power to the various electronic components in the apparatus 502. The power subsystem 530 may be any form of power supply, such as a conventional rechargeable battery (removable or non-removable), a fuel cell system, a solar cell, or the like, or any combination thereof. The apparatus 502 in some implementations may be electrically connectable to a fixed power supply such as a wall outlet. However, in those cases where the power subsystem 530 supports the portability of the apparatus 502, the apparatus effectively comprises a mobile apparatus.

The apparatus 502 may comprise other components that are not illustrated in FIG. 5 so as not to obscure the description of the concepts of interest.

Other functional block diagrams are contemplated, with the functions described above distributed among different components, integrated circuits, chipsets, memories, and processors.

What is claimed is:

1. A method in an apparatus having a wireless local area network (WLAN) transceiver, the method comprising:
    monitoring one or more sensors in the apparatus;
    from time to time, determining from among multiple mitigation levels a mitigation level applicable to the apparatus as a function of output from the one or more sensors;
    responsive to determining that the applicable mitigation level has increased from a most recent previously determined mitigation level, configuring a Media Access Control (MAC) layer of the WLAN transceiver to effect a decrease in a transmit duty cycle of the WLAN transceiver, wherein configuring the MAC layer of the WLAN transceiver to effect a decrease in the transmit duty cycle comprises increasing one or more interframe spacing parameters of the MAC layer, and configuring the WLAN transceiver to effect an increase in the transmit duty cycle comprises decreasing the one or more interframe spacing parameters; and
    responsive to determining that the applicable mitigation level has decreased from a most recent previously determined mitigation level, configuring the MAC layer of the WLAN transceiver to effect an increase in the transmit duty cycle of the WLAN transceiver.

2. The method as claimed in claim 1, wherein the one or more sensors comprise a proximity sensor and mitigation levels are negatively correlated with a distance of the apparatus to a human head or to a human lap as sensed by the proximity sensor.

3. The method as claimed in claim 1, wherein the one or more sensors comprise a thermal sensor positioned close enough to a power amplifier of the WLAN transceiver to sense thermal energy generated by the power amplifier and mitigation levels are positively correlated with temperatures as sensed by the thermal sensor.

4. The method as claimed in claim 1, wherein the apparatus comprises an additional wireless transceiver and the applicable mitigation level is determined as a function of state information for the additional wireless transceiver.

5. The method as claimed in claim 4, wherein the one or more sensors comprise a thermal sensor positioned close enough to a power amplifier of the additional wireless transceiver to sense thermal energy generated by the power amplifier and mitigation levels are positively correlated with temperatures as sensed by the thermal sensor.

6. The method as claimed in claim 4, wherein the state information includes whether the additional wireless transceiver is currently transmitting.

7. The method as claimed in claim 4, wherein the state information includes an identification of a type of network to which the additional wireless transceiver is currently connected.

8. The method as claimed in claim 4, wherein the state information includes an indication of a transmit duty cycle of the additional wireless transceiver.

9. The method as claimed in claim 4, wherein the state information includes an indication of a transmit power of the additional wireless transceiver.

10. The method as claimed in claim 4, wherein the additional wireless transceiver is a cellular modem.

11. The method as claimed in claim 4, wherein the additional wireless transceiver is a wireless personal area network transceiver.

12. An apparatus comprising:
    a host processor;
    a wireless local area network (WLAN) transceiver;
    one or more sensors;
    a memory coupled to the host processor, the memory storing a mitigation manager and a WLAN driver,
    wherein the mitigation manager, when executed by the host processor, is to determine, from time to time, from among multiple mitigation levels a mitigation level applicable to the apparatus as a function of output from the one or more sensors, each of the multiple mitigation levels corresponding to a set of configuration changes for a Media Access Control (MAC) layer of the WLAN transceiver, and
    wherein the WLAN driver, when executed by the host processor, is to receive the applicable mitigation level from the mitigation manager and to configure the MAC layer of the WLAN transceiver according to the set of configuration changes that corresponds to the applicable mitigation level, wherein configuring, when an applicable mitigation level has increased from a most recent previously determined mitigation level, the MAC layer of the WLAN transceiver to increases one or more interframe spacing parameters of the MAC layer and the WLAN to decreases the one or more interframe spacing parameters.

13. The apparatus as claimed in claim 12, wherein the one or more sensors comprise a proximity sensor and mitigation levels are negatively correlated with a distance of the apparatus to a human head or to a human lap as sensed by the proximity sensor.

14. The apparatus as claimed in claim 12, wherein the one or more sensors comprise a thermal sensor positioned close enough to a power amplifier of the WLAN transceiver to sense thermal energy generated by the power amplifier and mitigation levels are positively correlated with temperatures as sensed by the thermal sensor.

15. The apparatus as claimed in claim 12, further comprising an additional wireless transceiver, wherein the applicable mitigation level is determined as a function of state information for the additional wireless transceiver.

16. The apparatus as claimed in claim 15, wherein the one or more sensors comprise a thermal sensor positioned close enough to a power amplifier of the additional wireless transceiver to sense thermal energy generated by the power amplifier and mitigation levels are positively correlated with temperatures as sensed by the thermal sensor.

17. An apparatus comprising:
a host processor;
an integrated circuit coupled to the host processor, the integrated circuit comprising:
a dedicated processor;
a wireless local area network (WLAN) transceiver coupled to the dedicated processor, the WLAN transceiver having a configurable Media Access Control (MAC) layer;
a thermal sensor coupled to the dedicated processor, the thermal sensor positioned close enough to a power amplifier of the WLAN transceiver to sense thermal energy generated by the power amplifier; and
a memory coupled to the dedicated processor, the memory storing a mitigation manager, which, when executed by the dedicated processor, determines, from time to time, from among multiple mitigation levels a mitigation level applicable to the apparatus as a function of output from the thermal sensor, each of the multiple mitigation levels corresponding to a set of configuration changes for a Media Access Control (MAC) layer of the WLAN transceiver; and
a host memory coupled to the host processor, the host memory storing a WLAN driver which, when executed by the host processor, is to receive the applicable mitigation level from the host processor and to configure the MAC layer of the WLAN transceiver according to the set of configuration changes that corresponds to the applicable mitigation level, wherein configuring, when an applicable mitigation level has increased from a most recent previously determined mitigation level, the MAC layer of the WLAN transceiver to increases one or more interframe spacing parameters of the MAC layer and the WLAN to decreases the one or more interframe spacing parameters.

18. The apparatus as claimed in claim 17, further comprising a proximity sensor coupled to the host processor, wherein the mitigation manager, when executed by the dedicated processor, determines the applicable mitigation level as a function of output from the proximity sensor, and mitigation levels are negatively correlated with a distance of the apparatus to a human head or to a human lap as sensed by the proximity sensor.

19. The apparatus as claimed in claim 17, wherein mitigation levels are positively correlated with temperatures as sensed by the thermal sensor.

20. The apparatus as claimed in claim 17, wherein the integrated circuit further comprises an additional wireless transceiver and the applicable mitigation level is determined as a function of state information for the additional wireless transceiver.

21. The apparatus as claimed in claim 20, wherein the thermal sensor is positioned close enough to a power amplifier of the additional wireless transceiver to sense thermal energy generated by the power amplifier of the additional wireless transceiver.

* * * * *